United States Patent
Wang (10) Patent No.: US 11,002,901 B2
(45) Date of Patent: May 11, 2021

(54) LIGHT GUIDE FILM ASSEMBLY, FRONT LIGHT SOURCE AND REFLECTIVE DISPLAY DEVICE

(71) Applicants: Beijing BOE Display Technology Co., Ltd., Beijing (CN); BOE Technology Group Co., Ltd., Beijing (CN)

(72) Inventor: Shuo Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/558,903

(22) Filed: Sep. 3, 2019

(65) Prior Publication Data
US 2020/0073044 A1 Mar. 5, 2020

(30) Foreign Application Priority Data
Sep. 4, 2018 (CN) .......................... 201811025013.9

(51) Int. Cl.
*F21V 8/00* (2006.01)
*G02F 1/13357* (2006.01)
(52) U.S. Cl.
CPC ..... *G02B 6/0055* (2013.01); *G02F 1/133615* (2013.01); *G02B 2207/109* (2013.01)
(58) Field of Classification Search
CPC .. G02B 6/0055; G02B 6/0053; G02B 6/0036; G02B 6/0038; G02B 6/0076
See application file for complete search history.

(56) References Cited

U.S. PATENT DOCUMENTS

| | | | | |
|---|---|---|---|---|
| 5,396,350 A * | 3/1995 | Beeson | ................ | G02B 6/0053 349/62 |
| 6,129,439 A * | 10/2000 | Hou | .......................... | F21V 5/02 362/23.15 |
| 6,259,854 B1 * | 7/2001 | Shinji | ...................... | G02B 6/00 362/625 |

(Continued)

FOREIGN PATENT DOCUMENTS

CN 1766704 A 5/2006
CN 101403483 A 4/2009
(Continued)

OTHER PUBLICATIONS

First Office Action dated Oct. 8, 2019, for corresponding Chinese application 201811025013.9.

*Primary Examiner* — Jong-Suk (James) Lee
*Assistant Examiner* — Eric T Eide
(74) *Attorney, Agent, or Firm* — Nath, Goldberg & Meyer; Joshua B. Goldberg (57) ABSTRACT

The present disclosure provides a light guide film assembly for a reflective display panel, the light guide film assembly including a light guide film. The light guide film includes a front light exit surface and a rear light exit surface opposite to each other, and a light incident surface connected between the front light exit surface and the rear light exit surface. A plurality of microstructured strips are disposed on the rear light exit surface, and the plurality of microstructured strips are configured to reflect, in a direction away from the rear light exit surface, light transmitted from the light guide film to the plurality of microstructured strips.

13 Claims, 4 Drawing Sheets

(56) References Cited

U.S. PATENT DOCUMENTS

| | | | |
|---|---|---|---|
| 7,001,060 B1* | 2/2006 | Kimura | G02B 6/0053 |
| | | | 349/63 |
| 7,708,448 B2 | 5/2010 | Lee et al. | |
| 10,222,533 B2* | 3/2019 | Lee | G02B 6/005 |
| 2001/0035713 A1* | 11/2001 | Kimura | H01L 51/5268 |
| | | | 313/501 |
| 2015/0029744 A1* | 1/2015 | Van Ostrand | G02B 5/045 |
| | | | 362/606 |
| 2019/0331845 A1* | 10/2019 | Liang | G02B 6/0041 |

FOREIGN PATENT DOCUMENTS

| | | |
|---|---|---|
| CN | 101464586 A | 6/2009 |
| CN | 106569368 A | 4/2017 |
| WO | 2010004610 A1 | 1/2010 |

* cited by examiner

LIGHT GUIDE FILM ASSEMBLY, FRONT LIGHT SOURCE AND REFLECTIVE DISPLAY DEVICE

CROSS-REFERENCE TO RELATED APPLICATION

This application claims the benefit of priority to Chinese Patent Application No. 201811025013.9 filed on Sep. 4, 2018, the contents of which are incorporated herein by reference in the entirety.

TECHNICAL FIELD

The present disclosure relates to the field of display technology, and particularly relates to a light guide film assembly, a front light source and a reflective display device.

BACKGROUND

Reflective display devices include, for example, reflective liquid crystal display devices, electronic paper display devices, and the like. For example, in a reflective liquid crystal display device, ambient light is reflected after being incident on a reflective liquid crystal panel, and the state of liquid crystal molecules is controlled such that light reflection ratios of respective sub-pixels of the reflective liquid crystal panel are different, thereby implementing display.

In an environment where the ambient light is dark, it is necessary to provide a front light source to a reflective display panel, and light emitted by a line light source (for example, a lamp bar) provided as a light emitting member in the front light source is converted, by a light guide film assembly in the front light source, to function as a surface light source emitting light to the reflective display panel. The existing front light source has a relatively-high front light exit amount and a relatively-low rear light exit amount.

SUMMARY

According to a first aspect of the present disclosure, a light guide film assembly for a reflective display panel is provided. The light guide film assembly includes a light guide film including a front light exit surface and a rear light exit surface opposite to each other and a light incident surface connected between the front light exit surface and the rear light exit surface, and a plurality of microstructured strips on the rear light exit surface, the plurality of microstructured strips being configured to reflect, in a direction away from the rear light exit surface, light transmitted from the light guide film to the plurality of microstructured strips.

A longitudinal direction of the plurality of microstructured strips is parallel to a longitudinal direction of the light incident surface.

A cross section of at least one microstructured strip of the plurality of microstructured strips perpendicular to the longitudinal direction of the plurality of microstructured strips has a shape of trapezoid, one edge of the trapezoid close to the light guide film being a top base of the trapezoid, one edge of the trapezoid away from the light guide film being a bottom base of the trapezoid, and an angle between any one of legs of the trapezoid and the bottom base of the trapezoid being an acute angle.

A cross section of at least one microstructured strip of the plurality of microstructured strips perpendicular to the longitudinal direction of the plurality of microstructured strips has a shape of rectangle.

The plurality of microstructured strips and the light guide film have an integral structure.

The light guide film assembly further includes a first adhesive layer, the plurality of microstructured strips and the light guide film being adhered together by the first adhesive layer, and a difference between a maximum refractive index and a minimum refractive index of refractive indexes of the plurality of microstructured strips, the light guide film, the first adhesive layer is less than or equal to 0.02.

The refractive indexes of the plurality of microstructured strips, the light guide film, and the first adhesive layer are equal to each other.

An angle $\alpha$ between at least one of the legs and the bottom base of the trapezoid satisfies following formulas:

$$\begin{cases} \theta = 90° - \dfrac{180°}{\pi}\arcsin\left(\dfrac{1}{n}\right) \\ 180° - 2\alpha \leq 90° \\ 2\alpha - \theta \leq 90° \\ |180° - 4\alpha + \theta| \leq 20° \end{cases},$$

where $\theta$ is a complementary angle to a critical angle of total reflection for incidence from an internal of the light guide film to an external of the light guide film.

The angle $\alpha$ between the at least one of the legs and the bottom base of the trapezoid satisfies: $49.8° \leq \alpha \leq 59.8°$.

The trapezoid is an isosceles trapezoid

A height t of the trapezoid satisfies a following formula:

$$\dfrac{p}{\cot\theta - \cot\alpha} \leq t \leq \dfrac{2p}{\cot\theta - \cot\alpha},$$

where p is a length of the top base of the trapezoid, $\theta$ is a complementary angle to a critical angle of total reflection for incidence from an internal of the light guide film to an external of the light guide film, and $$\theta = 90° - \dfrac{180°}{\pi}\arcsin\left(\dfrac{1}{n}\right),$$

n is a refractive index of the at least one microstructured strip of the plurality of microstructured strips, and a is an angle between at least one of the legs and the bottom base of the trapezoid.

In the plurality of microstructured strips, a spacing between any two adjacent microstructured strips is gradually reduced in a direction away from the light incident surface in the light guide film.

A cross section of each of the plurality of microstructured strips perpendicular to the longitudinal direction of the plurality of microstructured strips has the shape of trapezoid, and in the plurality of microstructured strips, a distance between respective bottom bases of the cross sections of two adjacent ones of the plurality of microstructured strips is in a range from 2q to 10q, where q is a length of the bottom base of the trapezoid.

The light guide film assembly further includes a lower substrate layer on a side of the plurality of microstructured strips away from the rear light exit surface.

A refractive index of the lower substrate layer is larger than a refractive index of the plurality of microstructured strips.

According to a second aspect of the present disclosure, there is provided a front light source for a reflective display panel including a light emitting member and the above described light guide film assembly, a light exit surface of the light emitting member facing the light incident surface of the light guide film.

According to a third aspect of the present disclosure, there is provided a reflective display device including a reflective panel and a front light source outside a display surface of the reflective panel, the front light source being the above described front light source, and the rear light exit surface of the light guide film facing the reflective panel.

DETAILED DESCRIPTION

In order to enable those skilled in the art to better understand technical solutions of the present disclosure, the present disclosure will be further described in detail below in conjunction with the accompanying drawings and embodiments.

Reflective display panels include, for example, reflective liquid crystal display panels, electronic paper display panels, and the like. For convenience of description, only reflective liquid crystal panels are described below, but the present disclosure is not limited to reflective liquid crystal panels, and the present inventive concept is also applicable to other forms of reflective display panels (e.g., electronic paper).

Figure 1:
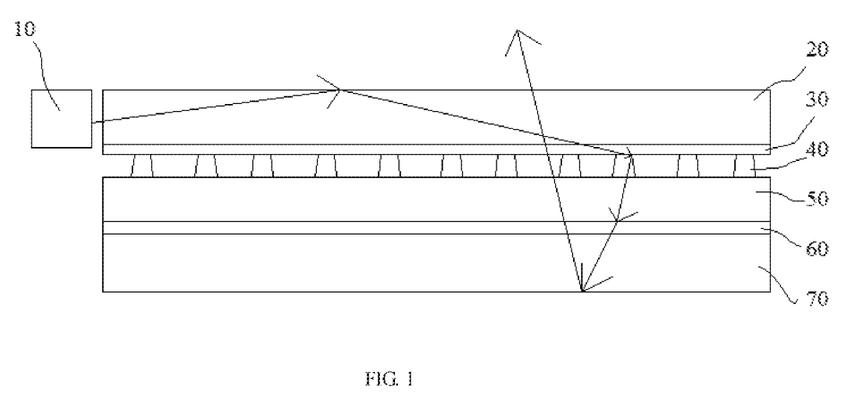
FIG. 1 is a cross-sectional view of a reflective liquid crystal display device according to an embodiment of the present disclosure.

FIG. 1 is a cross-sectional view of a reflective liquid crystal display device according to an embodiment of the present disclosure.

Referring to FIG. 1, a reflective liquid crystal display device according to an embodiment of the present disclosure includes a light emitting member 10, a light guide film 20, a first adhesive layer 30, microstructured strips 40, a lower substrate layer 50, a second adhesive layer 60 and a reflective liquid crystal display panel 70. The light guide film 20, the first adhesive layer 30, the microstructured strips 40 and the lower substrate layer 50 constitute a light guide film assembly.

According to an embodiment of the present disclosure, the light guide film 20 includes a front light exit surface and a rear light exit surface opposite to each other, and a light incident surface connected between the front light exit surface and the rear light exit surface. As shown in FIG. 1, the front light exit surface is an upper surface of the light guide film 20 and faces the user when the reflective liquid crystal display device performs display, the rear light exit surface is a lower surface of the light guide film 20 and faces the reflective liquid crystal display panel 70 when the reflective liquid crystal display device performs display, and the light incident surface faces the light emitting member 10.

A plurality of microstructured strips 40 are disposed on the rear light exit surface of the light guide film 20, and configured to reflect, in a direction away from the rear light exit surface, light transmitted from the light guide film 20 to the microstructured strips 40.

The light emitting member 10 is a line light source, for example, a lamp bar in which a plurality of LED lamps is arranged. Light emitted from the light emitting member 10 enters the light guide film 20 through the light incident surface of the light guide film 20, and by designing the angle of light emitted from the light emitting member 10, most of the light may be totally reflected in the light guide film 20. When light in the light guide film 20 is transmitted to the microstructured strips 40, the microstructured strips 40 reflect the light to the reflective liquid crystal display panel 70, thereby providing the reflective liquid crystal display panel 70 with a surface light source. The reflective liquid crystal display panel 70 then reflects light incident thereon to the light guide film 20 and then out of the light guide film 20, thereby realizing display.

In order to realize the display, film sheets (not shown) such as a polarizer, a half-wave plate and the like should be provided in the reflective liquid crystal display panel 70, and such film sheets may be of a conventional design, and detailed descriptions thereof will be omitted.

Figure 2:
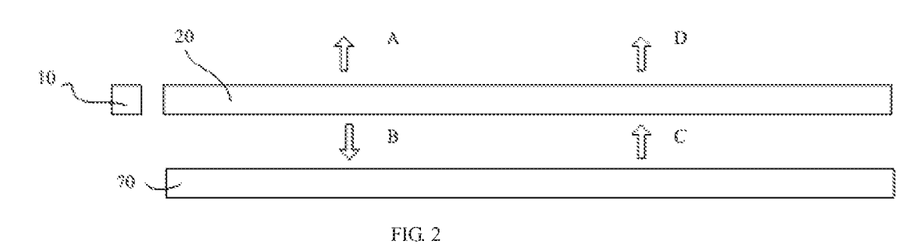
FIG. 2 is a schematic diagram illustrating light composition for a reflective liquid crystal display device according to an embodiment of the present disclosure.

FIG. 2 is a schematic view illustrating light composition for a reflective liquid crystal display device according to an embodiment of the present disclosure.

Light emitted from the light emitting member 10 are supposed to be totally reflected after entering the light guide film 20, but due to process limitation, a portion of the light cannot be totally reflected, and the portion of the light propagates in the light guide film 20 at other angles and is finally transmitted to the outside through the upper surface of the light guide film 20. Besides, due to process limitation, there may be, for example, uneven areas in the upper surface and/or lower surface of the light guide film 20, which will cause a portion of light supposed to be totally reflected in the light guide film 20 cannot be not totally reflected on the uneven areas, and finally transmitted to the outside through the upper surface of the light guide film 20. The light transmitted to the outside through the upper surface of the light guide film is the light transmitted from the front side of the light guide film 20. By setting the refractive index of the microstructured strips 40, light reflected on the lower surface of the light guide film 20 can be transmitted to the microstructured strips 40 and reflected by the microstructured strips 40 to the liquid crystal display panel 70, and thus acts as light transmitted from the rear side of the light guide film 20. Referring to FIG. 2, an amount of light emitted by the light emitting member 10, entering the light guide film 20, and then transmitted out through the front light exit surface is denoted by A (which means a front light exit amount), and an amount of light reflected by the microstructured strips 40 to the reflective liquid crystal display panel 70 is denoted by B (which means a rear light exit amount). An amount of light reflected by the reflective liquid crystal panel 70 to the light guide film 20 is denoted by C, and an amount of a portion of the light reflected by the reflective liquid crystal panel 70 to the light guide film 20, that is finally transmitted out by passing through the light guide film 20, is denoted by D.

A contrast CR of the reflective liquid crystal display device is determined by the following formula without considering the difference between C and D:

$$CR = \frac{A + B \times R1}{A + B \times R2},$$

where R1 is a reflective index of the reflective liquid crystal display panel 70 in the brightest gray scale, and R2 is a reflective index of the reflective liquid crystal display panel 70 in the darkest gray scale.

In the case where properties of the reflective liquid crystal display panel 70 are determined (i.e., in the case where R1 and R2 are determined), in order to improve the contrast of the reflective liquid crystal display device, it is necessary to increase B and reduce A as much as possible, that is, to make light entering the light guide film 20 to be transmitted to the reflective liquid crystal display panel 70 as much as possible.

According to an embodiment of the present disclosure, since the microstructured strips 40 are provided in the reflective liquid crystal display device, when light reflected in the light guide film 20 is incident on the lower surface of the light guide film 20, it can be reflected to the reflective liquid crystal display panel 70 via the microstructured strips 40 disposed on the lower surface of the light guide film 20 instead of being reflected to the light guide film 20 again, thereby increasing the rear light exit amount B and reducing the front light exit amount A. Therefore, the light guide film assembly according to an embodiment of the present disclosure can be advantageous in improving the contrast of the reflective liquid crystal display device.

According to an embodiment of the present disclosure, a longitudinal direction of the microstructured strips 40 is parallel to a longitudinal direction of the light incident surface. Generally, the longitudinal direction of the light incident surface is parallel to a longitudinal direction of the light emitting member 10, so that light reflected by the microstructured strips 40 to the reflective liquid crystal display panel 70 is uniform in the longitudinal direction of the light emitting member 10.

The above mentioned shape of the microstructured strips 40 is merely an example, and the disclosure is not limited thereto. The shape of the microstructure strips 40 in the longitudinal direction thereof may also be adjusted according to characteristics of light emitted by the light emitting member 10, and for example, the microstructured strip(s) 40 has(have) a shape having a certain curvature at a local position in the longitudinal direction thereof.

According to an embodiment of the present disclosure, a shape of a cross section of at least one of the microstructured strips 40 perpendicular to the longitudinal direction thereof may be a trapezoid or a rectangle. When the shape of the cross section is the trapezoid, one edge of the trapezoid close to the light guide film 20 is a top base of the trapezoid, and one edge of the trapezoid away from the light guide film 20 is a bottom base of the trapezoid, and an angle between any one of legs of the trapezoid and the bottom base of the trapezoid is an acute angle.

Figure 3:
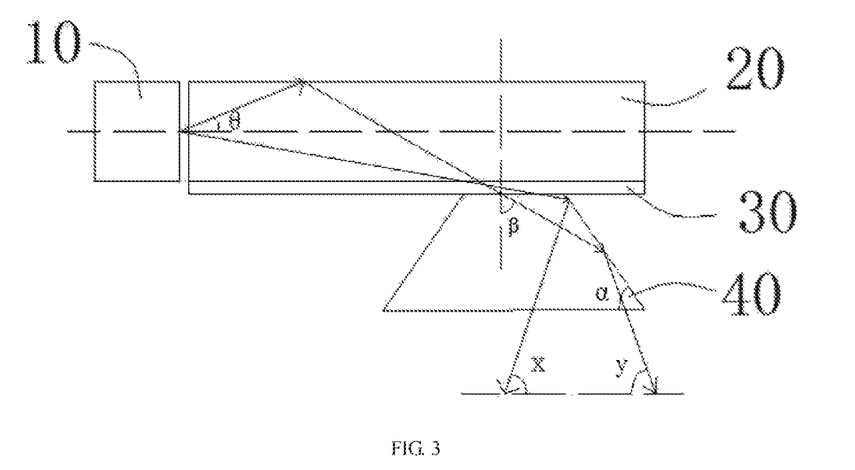
FIG. 3 is a cross-sectional view of a partial structure of a front light source according to an embodiment of the present disclosure.
Figure 4:
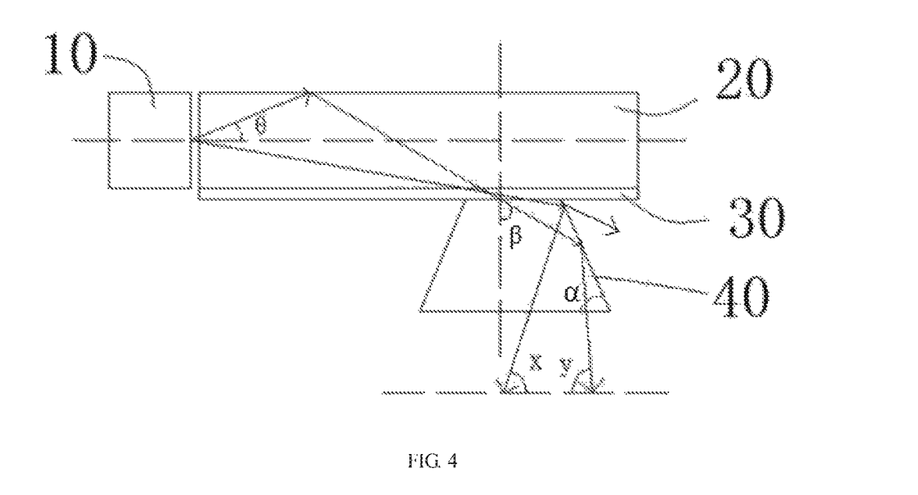
FIG. 4 is a cross-sectional view of a partial structure of a front light source according to an embodiment of the present disclosure.
Figure 5:
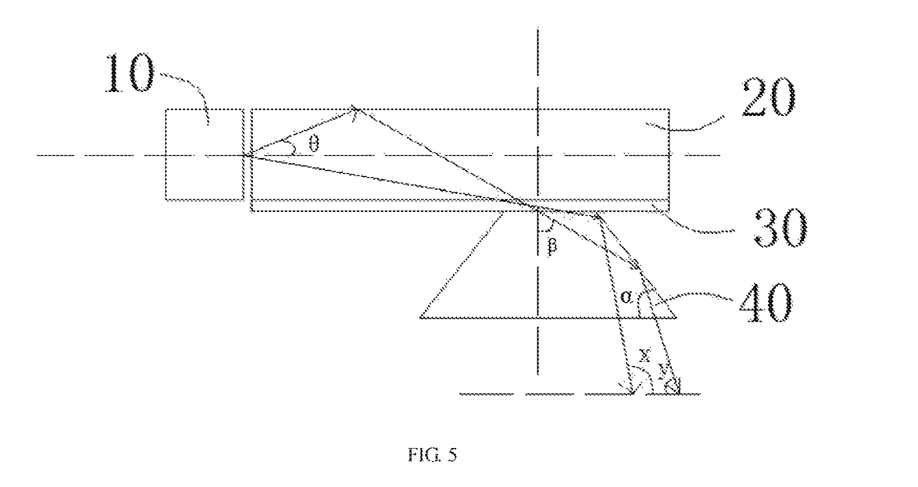
FIG. 5 is a cross-sectional view of a partial structure of a front light source according to an embodiment of the present disclosure.

FIG. 3 is a cross-sectional view of a partial structure of a front light source according to an embodiment of the present disclosure, FIG. 4 is a cross-sectional view of a partial structure of a front light source according to an embodiment of the present disclosure, and FIG. 5 is a cross-sectional view of a partial structure of a front light source according to an embodiment of the present disclosure.

Referring to FIGS. 3 to 5, an angle between a leg of the trapezoid-shaped section and the bottom base of the trapezoid-shaped section is an acute angle. By doing so, light incident on the microstructured strips 40 via the light guide film 20 can be effectively reflected to the reflective liquid crystal display panel 70, so that the amount of light transmitted to the reflective liquid crystal display panel 70 is increased, thereby increasing the amount of light labeled C in FIG. 2 and facilitating the improvement of the contrast.

According to an embodiment of the present disclosure, the first adhesive layer 30 may be disposed between the lower surface of the light guide film 20 and the microstructured strips 40 to adhere the light guide film 20 and the microstructured strips 40 together. When the microstructured strips 40 and the light guide film 20 are adhered together by the first adhesive layer 30, refractive indexes of the microstructured strips 40, the light guide film 20 and the first adhesive layer 30 may be set such that a difference between the maximum refractive index and the minimum refractive index of the three refractive indexes is less than or equal to 0.02, to make the attenuation of light propagating in the microstructured strips 40, the light guide film 20 and the first adhesive layer 30 as low as possible. For example, the microstructured strips 40 may be prepared by an injection molding process, a UV gel molding process, an exposure-and-development process and the like, and then adhered to the light guide film 20 by the first adhesive layer 30.

For example, the refractive indexes of the microstructured strips 40, the light directing film 20 and the first adhesive layer 30 may be equal. For example, the light guide film 20 is made of polycarbonate (PC) which has a refractive index of 1.58; the first adhesive layer 30 and the microstructured strips 40 are both made of UV gel which has a refractive index of 1.58, and the refractive index of the UV gel can be achieved by adjusting the specific composition of the UV gel.

According to an embodiment of the present disclosure, the microstructured strips 40 and the light guide film 20 may also have an integral structure. In this case, the first adhesive layer 30 for adhering the light guide film 20 and the microstructured strips 40 may not be included in the reflective liquid crystal display device, and since the light guide film 20 and the microstructured strips 40 are integrally formed, the refractive indexes thereof are equal and the attenuation of light propagating in the light guide film 20 and the microstructured strips 40 is smaller. For example, the integral structure can be realized by mechanical processing or the like.

It should be noted that, in current view angles of FIGS. 3 to 5, most of the light totally reflected in the light guide film 20 is transmitted to the microstructured strips 40 in a direction from left to right, and a small part of the light is transmitted to the microstructured strips 40 in a direction from right to left. Although the intensities of light in the two directions are different, ranges of the angles between the light in the two directions and the top base of the trapezoid-shaped section are the same. The dashed lines in FIGS. 3 to 5 indicate horizontal and vertical directions, respectively.

In FIGS. 3 to 5, two optical paths are respectively marked, one of which corresponds to light (which corresponds to angles θ, β, and y indicated in FIGS. 3 to 5) in the light guide film 20 having a critical angle of total reflection for incidence from an internal of the light guide film to an external of the light guide film, and the other of which corresponds to light (which corresponds to an angle x indicated in FIGS. 3 to 5) transmitted from the light guide film 20 to the microstructured strips 40 in an approximately horizontal direction. In an embodiment, the angle θ is an angle between the light having the critical angle of total reflection and the plane direction (the upper horizontal dashed line in FIG. 3) of the light exit surface, that is, the sum of the angle θ and the critical angle of total reflection for incidence from the internal of the light guide film to the external of the light guide film is 90°, the angle β is an incident angle of the light having the critical angle of total reflection when entering the microstructured strips 40, the angle y is a difference between 90° and an incident angle of the light having the critical angle of total reflection transmitted to the reflective liquid crystal display panel 70 (the lower horizontal dashed line in FIG. 3 indicates the plane direction of the upper surface of the reflective liquid crystal display panel 70), and the angle x is a difference between 90° and an incident angle of the light transmitted to the reflective liquid crystal display panel 70 in the approximately horizontal direction.

According to an embodiment of the present disclosure, an angle α between at least one leg of the trapezoid-shaped section and the bottom base of the trapezoid-shaped section satisfies the following formula:

$$\begin{cases} \theta = 90° - \dfrac{180°}{\pi} \arcsin\left(\dfrac{1}{n}\right) \\ x = 180° - 2\alpha \\ y = 2\alpha - \theta \\ x \leq 90° \\ y \leq 90° \\ |x - y| \leq 20° \end{cases},$$

where n is the refractive index of the microstructured strips 40.

By the above arrangement, a direction of light reflected from the microstructured strips 40 to the reflective liquid crystal display panel 70 is substantially perpendicular to the reflective liquid crystal panel 70, thereby increasing the light exit amount labeled C in FIG. 2 and facilitating the improvement of brightness and contrast of the reflective liquid crystal display device.

According to the above formula, if a UV gel having a refractive index of 1.58 is selected as the material of the microstructured strips 40, a range of the angle α between any leg of the trapezoid and the bottom base of the trapezoid may be set such that 49.8°≤α≤59.8°. In the case where the difference between the maximum refractive index and the minimum refractive index in the refractive indexes of the microstructured strips 40, the light guide film 20, and the first adhesive layer 30 is less than or equal to 0.02, the range of the angle α is also applicable to the microstructured strips 40 made of other materials.

In an embodiment, referring to FIG. 4, if the angle α between the leg and the bottom base of the trapezoid-shaped section of the microstructured strips 40 is too large, part of light will be transmitted to the outside of the microstructured strips 40 at the leg of the trapezoid, that is, there is no guarantee that the reflection in the microstructured strips 40 will be a total reflection.

In an embodiment, referring to FIG. 5, if the angle α between the leg and the bottom base of the trapezoid-shaped section of the microstructured strips 40 is too small, light reflected at the leg to the reflective liquid crystal display panel 70 is too oblique, which is disadvantageous for the improvement of brightness and contrast.

In an embodiment, the trapezoid is an isosceles trapezoid. That is, light transmitted from the light guide film 20 to the microstructured strips 40 in FIGS. 3 to 5, regardless of whether its direction is from left to right or from right to left, is transmitted to the reflective liquid crystal display panel 70 in a direction approximately perpendicular to the reflective liquid crystal display panel 70.

Figure 6:
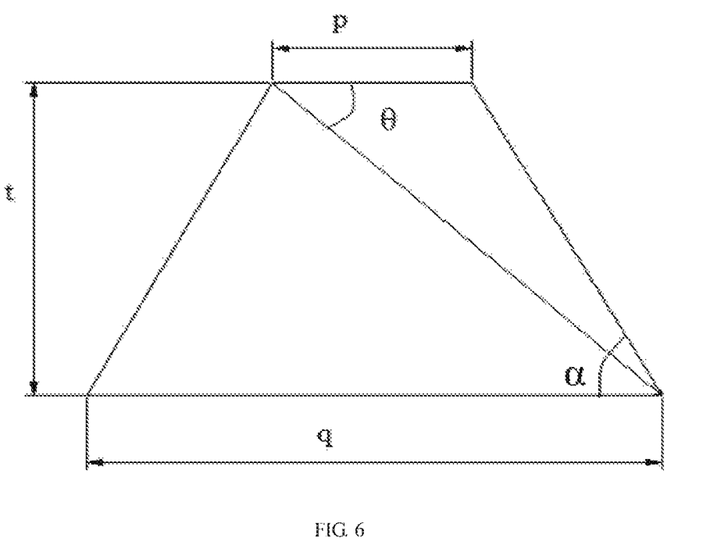
FIG. 6 is a schematic diagram illustrating a dimension of a cross-section of a microstructured strip according to an embodiment of the present disclosure.

FIG. 6 is a schematic diagram illustrating a dimension of a cross-section of a microstructured strip according to an embodiment of the present disclosure.

Referring to FIG. 6, a height t of the trapezoid satisfies the following formula:

$$\dfrac{p}{\cot\theta - \cot\alpha} \leq t \leq \dfrac{2p}{\cot\theta - \cot\alpha},$$

where p is a length of the top base of the trapezoid.

If the height t of the trapezoid is too small, light transmitted from the light guide film 20 to the microstructured strips 40 will directly arrive to the bottom base of the trapezoid, and the light cannot undergo the reflection at the leg of the trapezoid. If the height t of the trapezoid is too large, the overall thickness of the light guide film assembly will be increased, and the bottom bases of the trapezoid-shaped sections of different microstructured strips 40 may be in contact with each other.

An origin of the lower limit in the above formula is as follows. Light marked in FIG. 6 is light corresponding to the critical angle of total reflection, which is transmitted right from a left end point of the top base of the trapezoid to a right end point of the bottom base of the trapezoid, and the following formula can be obtained:

$$p + \dfrac{1}{\tan\alpha} = \dfrac{t}{\tan\theta}.$$

The lower limit of the height t of the trapezoid is obtained by solving the equation. Taking a case where the light guide film 20 is formed of PC, and the first adhesive layer 30 and the microstructured strips 40 are formed of UV gel as an example, the value of θ is 39.3°, and when the value of α is set to 54.8°, the lower limit of the height t of the microstructured strips 40 is 1.94p.

According to an embodiment of the present disclosure, in the microstructured strips 40, spacing between any two adjacent microstructured strips is gradually reduced in a direction away from the light incident surface in the light guide film.

Along a light emitting direction of the light emitting member 10, that is, a direction away from the light incident surface of the light guide film 20, which is a direction away from the light emitting member 10, light in the light guide film 20 is gradually weakened. In order to ensure the uniformity of light reflected from the microstructured strips 40 to the reflective liquid crystal display panel 70, the spacing between any two adjacent microstructured strips may be set to be gradually reduced along the direction of the light emitting direction of the light emitting member 10.

According to an embodiment of the present disclosure, a distance between respective bottom bases of the trapezoid-shaped sections of adjacent microstructured strips 40 ranges from 2q to 10q, where q is the length of the bottom base of the trapezoid.

If the distance between the bottom bases of the trapezoid-shaped sections of adjacent microstructured strips 40 is too small, light may be transmitted to outside substantially near the light emitting member 10, and the light exit amount in an area away from the light emitting member 10 is insufficient. If the distance between the bottom bases of the trapezoid-shaped sections of adjacent microstructured strips 40 is too large, the brightness uniformity may be adversely affected, and bright stripes and dark stripes are present at positions corresponding to the microstructured strips 40 and positions with no microstructure strip, respectively.

According to an embodiment of the present disclosure, a lower substrate layer 50 is further disposed on a lower surface of the microstructured strips 40. The lower substrate layer 50 may serve as a carrier for the microstructured strips 40 to protect the microstructured strips 40.

According to an embodiment of the present disclosure, the refractive index of the lower substrate layer 50 is greater than the refractive index of the microstructured strips 40. By making the refractive index of the lower substrate layer 50 larger than the refractive index of the microstructured strips 40 as much as possible, a light exit angle at the lower substrate layer 50 can be reduced, so that light transmitted to the reflective liquid crystal panel 70 is more approximately perpendicular to the reflective liquid crystal panel 70, which is advantageous for improving brightness.

According to an embodiment of the present disclosure, the lower substrate layer 50 and the reflective liquid crystal display panel 70 may be adhered together by a second adhesive layer 60.

A front light source according to an embodiment of the present disclosure is used for the reflective display panel. The front light source includes the light guide member 10 and the light guiding film assembly consisting of the light guide film 20, the first adhesive layer 30, the microstructured strips 40 and the lower substrate layer 50 as shown in FIG. 1, and the light exit surface of the light emitting member 10 faces the light incident surface of the light guide film 20.

A reflective display device according to an embodiment of the present disclosure includes a reflective display panel (such as the reflective liquid crystal display panel 70 shown in FIG. 1) and a front light source provided outside the display surface of the reflective liquid crystal display panel 70. The front light source includes the light guide member 10 and the light guide film assembly consisting of the light guide film 20, the first adhesive layer 30, the microstructured strips 40 and the lower substrate layer 50 as shown in FIG. 1, and the rear light exit surface of the light guide film 20 faces the reflective liquid crystal display panel 70.

According to an embodiment of the present disclosure, the reflective display panel may further include other reflective display panels such as an electronic paper.

In an embodiment, the reflective display device according to an embodiment of the present disclosure may be any product or component having a display function, such as a reflective liquid crystal display module, an electronic paper display device, a display, or the like.

Figure 7:
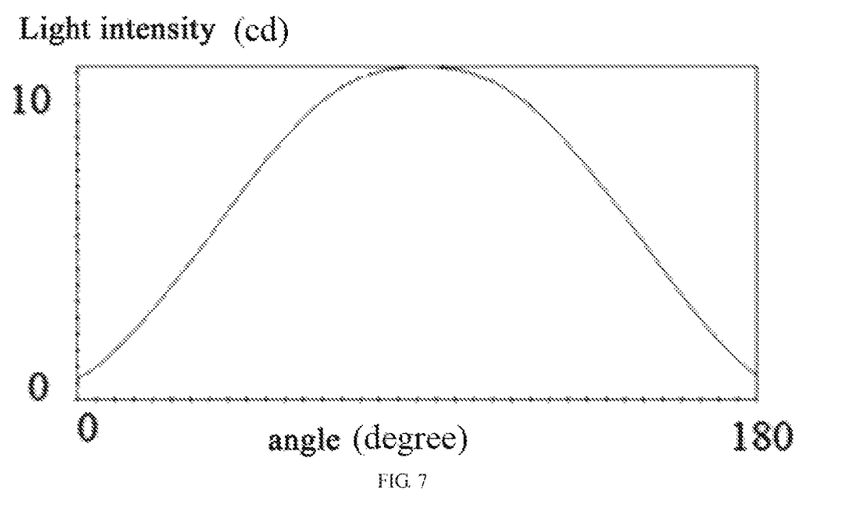
FIG. 7 is a schematic diagram illustrating a relationship between light intensity and a light exit angle of an exemplary reflective liquid crystal display device according to an embodiment of the present disclosure.
Figure 8:
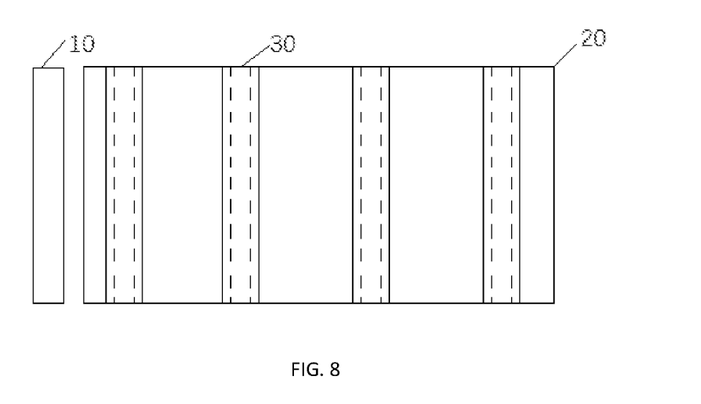
FIG. 8 is a plan view of the reflective liquid crystal display device according to an embodiment of the present disclosure.
Figure 9:
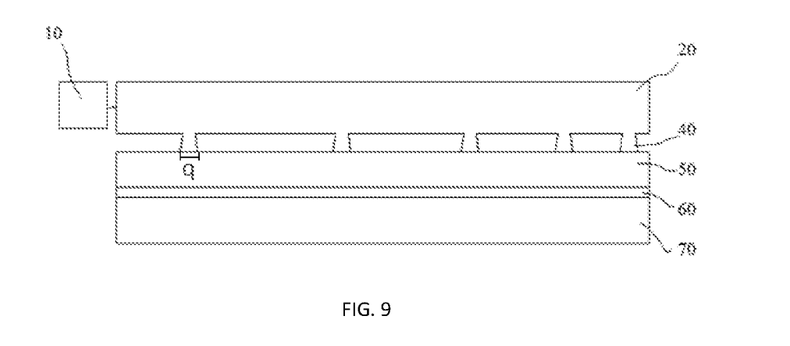
FIG. 9 is a cross-sectional view of a reflective liquid crystal display device according to an embodiment of the present disclosure.

FIG. 7 is a schematic diagram illustrating a relationship between light intensity and a light exit angle (the light exit angle of the light transmitted from the reflective liquid crystal display panel 70) of an example reflective liquid crystal display device according to an embodiment of the present disclosure.

According to an embodiment of the present disclosure, the light guide film 20 is made of PC and has a thickness of 300 µm; the first adhesive layer 30 is made of UV gel and has a thickness of 10 µm; the microstructured strips 40 are made of UV gel and have a thickness of 9.7 µm; the lower substrate layer 50 is made of PET and has a thickness of 100 µm; the reflective liquid crystal display panel 70 is adhered to the lower substrate layer 50 by the second adhesive layer 60, and the second adhesive layer 60 is made of OCA and has a thickness of 20 µm. The cross section of each of the microstructured strips 40 has a shape of an isosceles trapezoid, the length of the top base thereof is 5 µm, the length of the bottom base thereof is 18.7 µm, the height thereof is 9.7 µm, and the angle between a leg thereof and the bottom base thereof is 54.8°.

The front light exit amount A of the light guide film 20 of the reflective liquid crystal display device is measured as 0.048 Lm, the rear light exit amount B is measured as 35.5 Lm, and A:B=1:740, which greatly enhances the contrast of reflective liquid crystal display device.

Referring to FIG. 7, it can be seen that most of light is reflected by the reflective liquid crystal display panel 70 in a direction approximately perpendicular to the reflective liquid crystal display panel 70, which indicates that light emitted from the front light source to the reflective liquid crystal display panel 70 is also substantially perpendicular to the reflective liquid crystal display panel 70, and thus the brightness of the reflective liquid crystal display device is improved.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the protective scope of the disclosure.

The invention claimed is:

1. A light guide film assembly for a reflective display panel, and the light guide film comprosing:
    a light guide film comprising a front light exit surface and a rear light exit surface opposite to each other, and a light incident surface connected between the front light exit surface and the rear light exit surface; and
    a plurality of microstructured strips on the rear light exit surface, the plurality of microstructured strips being configured to reflect, in a direction away from the rear light exit surface, light transmitted from the light guide film to the plurality of microstructured strips,
    wherein a longitudinal direction of the plurality of microstructured strips is parallel to a longitudinal direction of the light incident surface,
    a cross section of at least one microstructured strip of the plurality of microstructured strips perpendicular to the longitudinal direction of the plurality of microstructured strips has a shape of trapezoid, one edge of the trapezoid close to the light guide film being a top of the trapezoid, one edge of the trapezoid away from the light guide film being a bottom base of the trapezoid, and an angle between any one of legs of the trapezoid and the bottom base of the trapezoid being an acute angle (FIG. 1A), wherein a height t of the trapezoid satisfies a following formula:

$$\frac{p}{\cot\theta - \cot\alpha} \leq t \leq \frac{2p}{\cot\theta - \cot\alpha},$$

where p is a length of the top base of the trapezoid, θ is a complementary angle to a critical angle of total reflection for incidence from an internal of the light guide film to an external of the light guide film, and $$\theta = 90° - \frac{180°}{\pi}\arcsin\left(\frac{1}{n}\right),$$

n is a refractive index of the at lease one microstructured strip of the plurality of microstructured strips, and α is an angle between at least one of the legs and the bottom base of the trapezoid,
wherein a cross section of each of the plurality of microstructured strips perpendicular to the longitudinal direction of the plurality of microstructured strips has the shape of trapezoid, and in the plurality of microstructured strips, a distance between respective bottom bases of the cross sections of two adjacent ones of the plurality of microstructured strips is in a range from 2q to 10q where q is a length of the bottom base of the trapezoid.

2. The light guide film assembly of claim 1, wherein a cross section of at least one microstructured strip of the plurality of microstructured strips perpendicular to the longitudinal direction of the plurality of microstructured strips has a shape of rectangle.

3. The light guide film assembly of claim 1, wherein the plurality of microstructured strips and the light guide film have an integral structure.

4. The light guide film assembly of claim 1, further comprising a first adhesive layer, the plurality of microstructured strips and the light guide film being adhered together by the first adhesive layer, wherein a difference between a maximum refractive index and a minimum refractive index of refractive indexes of the plurality of microstructured strips, the light guide film and the first adhesive layer is less than or equal to 0.02.

5. The light guide film assembly of claim 4, wherein the refractive indexes of the plurality of microstructured strips, the light guide film and the first adhesive layer are equal to each other.

6. The light guide film assembly of claim 1, wherein the angle α between at least one of the legs and the bottom base of the trapezoid satisfies following formulas:

$$\begin{cases} \theta = 90° - \frac{180°}{\pi}\arcsin\left(\frac{1}{n}\right) \\ 180° - 2\alpha \leq 90° \\ 2\alpha - \theta \leq 90° \\ |180° - 4\alpha + \theta| \leq 20° \end{cases},$$

where θ is a complementary angle to a critical angle of total reflection for incidence from an internal of the light guide film to an external of the light guide film.

7. The light guide film assembly of claim 6, wherein the angle α between the at least one of the legs and the bottom base of the trapezoid satisfies: 49.8°<α<59.8°.

8. The light guide film assembly of claim 1, wherein the trapezoid is an isosceles trapezoid.

9. The light guide film assembly of claim 1, wherein in the plurality of microstructured strips, a spacing between any two adjacent microstructured strips is gradually reduced in a direction away from the light incident surface in the light guide film.

10. The light guide film assembly of claim 1, further comprising a lower substrate layer on a side of the plurality of microstructured strips away from the rear light exit surface.

11. The light guide film assembly of claim 10, wherein a refractive index of the lower substrate layer is larger than a refractive index of the plurality of microstructured strips.

12. A front light source for a reflective display panel, the front light source comprising a light emitting member and the light guide film assembly according to claim 1, a light exit surface of the light emitting member facing a light incident surface of the light guide film.

13. A reflective display device, comprising a reflective panel and a front light source outside a display surface of the reflective panel, wherein the front light source is the front light source of claim 12, and the rear light exit surface of the light guide film faces the reflective panel.

* * * * *